(No Model.)
R. F. HALL.
MEANS FOR SECURING CRANKS AND SPROCKET WHEELS TO PEDAL SHAFTS OF CYCLES.
No. 536,694. Patented Apr. 2, 1895.
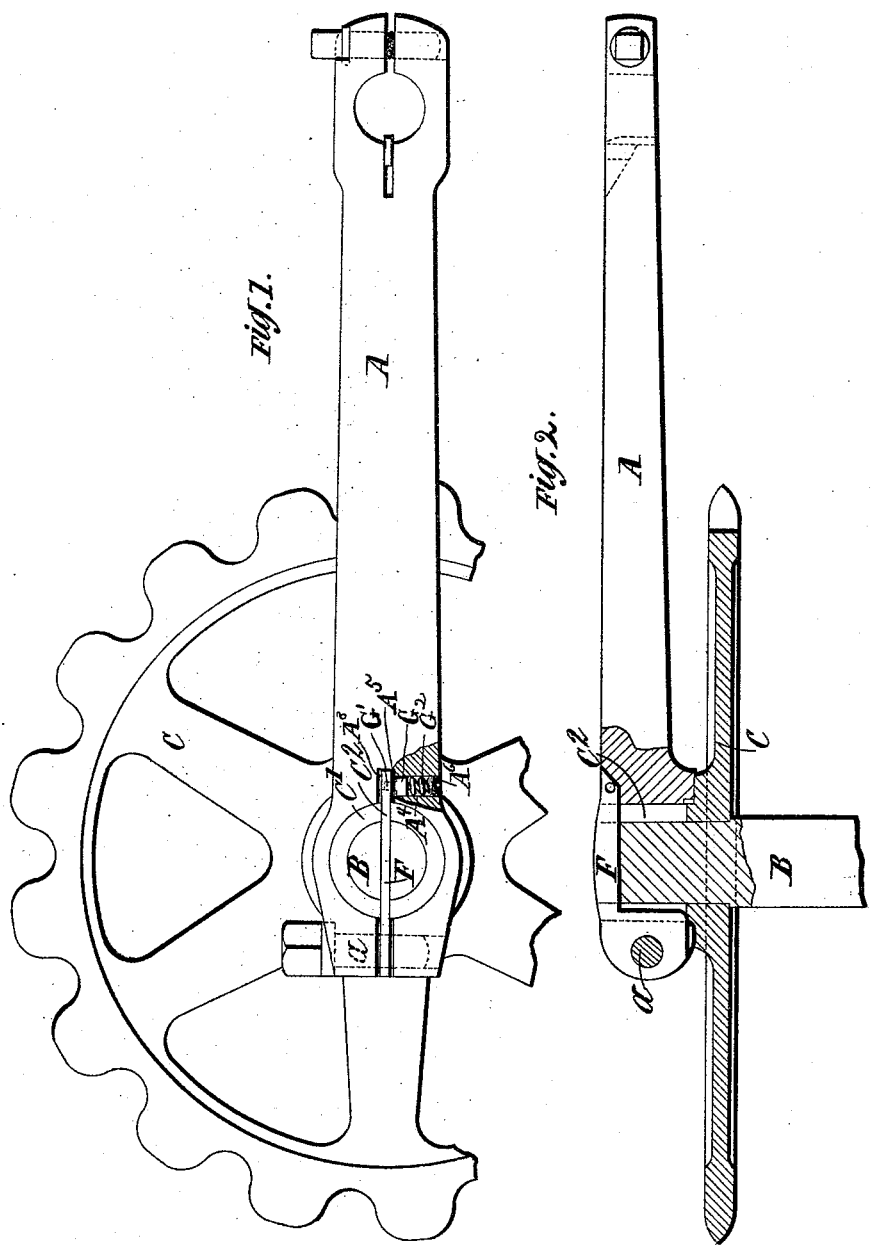
Witnesses:
Raphaël Netter
Robt. F. Gaylord
Inventor
Robert Frederick Hall
by Duncan & Page
Attorneys.

UNITED STATES PATENT OFFICE.

ROBERT FREDERICK HALL, OF MOSELEY, ENGLAND.

MEANS FOR SECURING CRANKS AND SPROCKET-WHEELS TO PEDAL-SHAFTS OF CYCLES.

SPECIFICATION forming part of Letters Patent No. 536,694, dated April 2, 1895.

Application filed May 22, 1894. Serial No. 512,060. (No model.)

*To all whom it may concern:*

Be it known that I, ROBERT FREDERICK HALL, a subject of the Queen of Great Britain, residing at Moseley, near Birmingham, England, have invented certain new and useful Improvements in Means for Securing Cranks and Sprocket-Wheels to the Pedal-Shafts of Cycles, of which the following is a specification, reference being had to the drawings accompanying and forming a part of the same.

This invention is an improved means for securing the sprocket or chain wheel of a cycle to the axle or pedal shaft by means of a crank which carries a pedal.

The improvement resides in the combination of parts hereinafter described and specifically enumerated in the claims.

Referring to the drawings which illustrate my improvements, Figure 1 is a side view partly in section and Fig. 2 is a plan view partly in section, of the same device.

B designates a shaft or axle which may be any shaft or axle to which a sprocket or gear wheel and crank are to be connected, but which in the present illustration of the invention is intended to represent the driving axle of a bicycle.

C is the chain gear, or sprocket wheel, having a boss C' which surrounds the axle. This boss is tubular and surrounds the end of the axle B as shown. It is also slit or slotted as shown at C² for the reception of the cross key F.

A is the crank having a boss which is slit as shown at Fig. 1 and which is fitted over the boss C' of the gear wheel C.

I provide a screw $a$ by means of which the jaws of the crank can be drawn together. Pivoted between the jaws of the crank on the clamping screw $a$ is the cross key F which passes through a slot in the end of the axle B. The part of the cross-key which lies between the jaws of the crank is made of such thickness that when the clamping screw $a$ is screwed up and the crank tightened on its axle the cross-key is not gripped by the jaws of the crank.

I preferably provide a spring or other catch in the crank to receive the end of the cross-key to prevent the possibility of the key rotating on its pivot when the crank and shaft are being used. Such a spring pin is shown in Fig. 1, where A⁴ is a hole drilled in the side of the crank to within a short distance of the slot, said hole being the same diameter as the largest portion G of the spring pin. The remaining part G' of the pin is of smaller diameter and projects through a hole A⁵ of smaller diameter into the slot A³. At the back of the spring I provide a spring G² which presses the pin toward the slot A³ and the hole A⁴ is finally closed by the screw plug A⁶. When the cross-key is in place the projecting part G' of the pin beds in a shallow hole in said key. Said projecting part G' is rounded at the end as shown so that the key can be moved in and out of the slot automatically pressing back the spring pin.

The slotted end of the crank is passed over the boss C' of the gear wheel, and the slit in the latter is of such length that when the jaws of the crank are tightened by screwing up the clamping screw $a$ the boss of the gear wheel is tightened on the axle and also the cross-key F is gripped between the two portions of the boss. This slit in the boss may however be of only such width as to receive the cross-key. The said key may be of any proper shape or character.

What I claim is—

1. The combination with a shaft, of a crank having a slotted end forming two jaws, a clamping screw for drawing the said jaws together, a wheel having a slotted boss which surrounds the shaft and is inclosed between the jaws of the crank, and a cross-key pivoted on the clamping screw and passing through slots in the shaft and boss of the wheel, substantially as described.

2. The combination with a shaft, of a crank having a slotted end forming two jaws, a clamping screw for drawing said jaws together, a wheel having a slotted boss which surrounds the shaft and is inclosed between the jaws of the crank, a cross-key pivoted on the clamping screw and passing through slots in the shaft and boss of the wheel, and means for preventing said cross-key from rotating on its pivot, substantially as described.

In witness whereof I have hereunto set my hand this 8th day of May, 1894.

ROBERT FREDERICK HALL.

Witnesses:
 WALTER DEWIS,
 L. COKER.